(12) United States Patent
Yuan et al.

(10) Patent No.: US 12,395,228 B2
(45) Date of Patent: Aug. 19, 2025

(54) TECHNIQUES FOR REPEATING A TRANSPORT BLOCK USING SPATIAL DIVISION MULTIPLEXING

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 17/996,567

(22) PCT Filed: Apr. 21, 2020

(86) PCT No.: PCT/CN2020/085764
§ 371 (c)(1),
(2) Date: Oct. 19, 2022

(87) PCT Pub. No.: WO2021/212295
PCT Pub. Date: Oct. 28, 2021

(65) Prior Publication Data
US 2023/0208568 A1    Jun. 29, 2023

(51) Int. Cl.
*H04B 7/04* (2017.01)
*H04B 7/06* (2006.01)
(Continued)

(52) U.S. Cl.
CPC ............ *H04B 7/0697* (2013.01); *H04B 7/04* (2013.01); *H04L 1/1864* (2013.01); *H04L 1/189* (2013.01);
(Continued)

(58) Field of Classification Search
CPC ....... H04B 7/0697; H04B 7/04; H04L 1/1864; H04L 1/1896; H04L 1/189; H04L 5/0025; H04L 5/0044
See application file for complete search history.

(56) References Cited

U.S. PATENT DOCUMENTS

2019/0261280 A1    8/2019   Jung et al.
2021/0307051 A1*   9/2021   Chatterjee .......... H04W 72/0453
2023/0291531 A1*   9/2023   Kim ...................... H04L 5/0091

FOREIGN PATENT DOCUMENTS

CN    109906576 A      6/2019
WO    2018231785 A1   12/2018
(Continued)

OTHER PUBLICATIONS

Huawei., et al., "Summary of Evaluation Results for Reliability Robustness Based Multi-TRP Transmission", 3GPP TSG RAN WG1 Meeting #96bis, 3GPP Draft; R1-1905806, 3rd Generation Partnership Project (3GPP), Mobile Competence Centre; 650, Route Des Lucioles; F-06921 Sophia-Antipolis Cedex; France, vol. RAN WG1, No. Xi 'an, China; Apr. 8, 2019-Apr. 12, 2019, Apr. 15, 2019 (Apr. 15, 2019), 35 Pages, XP051704916, pp. 18-32, The whole document.
(Continued)

*Primary Examiner* — Kent Krueger
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit, to a base station, an indication that the UE is capable of transmitting or receiving transport block (TB) repetitions using spatial division multiplexing (SDM). The UE may receive, from the base station and based at least in part on the indication, at least one downlink control information (DCI) message that schedules a TB in a first
(Continued)

resource and a repetition of the TB in a second resource, the first resource and the second resource at least partially overlapping in a time domain and a frequency domain. The UE may communicate the TB and the repetition of the TB using different antenna panels according to the at least one DCI message. Numerous other aspects are provided.

35 Claims, 12 Drawing Sheets

(51) Int. Cl.
  *H04L 1/1829* (2023.01)
  *H04L 1/1867* (2023.01)
  *H04L 5/00* (2006.01)

(52) U.S. Cl.
  CPC .......... *H04L 1/1896* (2013.01); *H04L 5/0025* (2013.01); *H04L 5/0044* (2013.01)

(56) References Cited

FOREIGN PATENT DOCUMENTS

| WO | 2018231971 A1 | 12/2018 |
|---|---|---|
| WO | WO-2020033884 A1 | 2/2020 |
| WO | WO-2020063563 A1 | 4/2020 |

OTHER PUBLICATIONS

International Search Report and Written Opinion—PCT/CN2020/085764—ISA/EPO—Jan. 20, 2021.
Huawei., et al., "Discussion of Rate Matching Methods for PDSCH Reliability Enhancement Schemes with Multi-TRP Panel", 3GPP TSG RAN WG1 meeting #96b, R1-1905268, 3rd Generation Partnership Project (3GPP), Mobile Competence Centre, 650, Route Des Lucioles, F-06921, Sophia-Antipolis Cedex, France, vol. RAN WG1, No. Xi'an, China, Apr. 8, 2019-Apr. 12, 2019, Apr. 7, 2019, 12 Pages, XP051700338, p. 3-p. 5, Figure 2.
NTT DOCOMO, Inc: "Enhancements on Multi-TRP/Panel Transmission", 3GPP Draft, 3GPP TSG RAN WG1 #96, R1-1902812, Enhancements on Multi-TRP_Panel Transmission, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051600507, 25 Pages.
Supplementary European Search Report—EP20931762—Search Authority—The Hague—Nov. 6, 2023.
Huawei, et al., "Discussion of rate matching methods for PDSCH reliability enhancement schemes with multi-TRP panel", R1-1905268, 3GPP TSG RAN WG1 meeting #96b, Xi'an, China, Apr. 8-12, 2019, 12 Pages, Sections 1-3.

\* cited by examiner

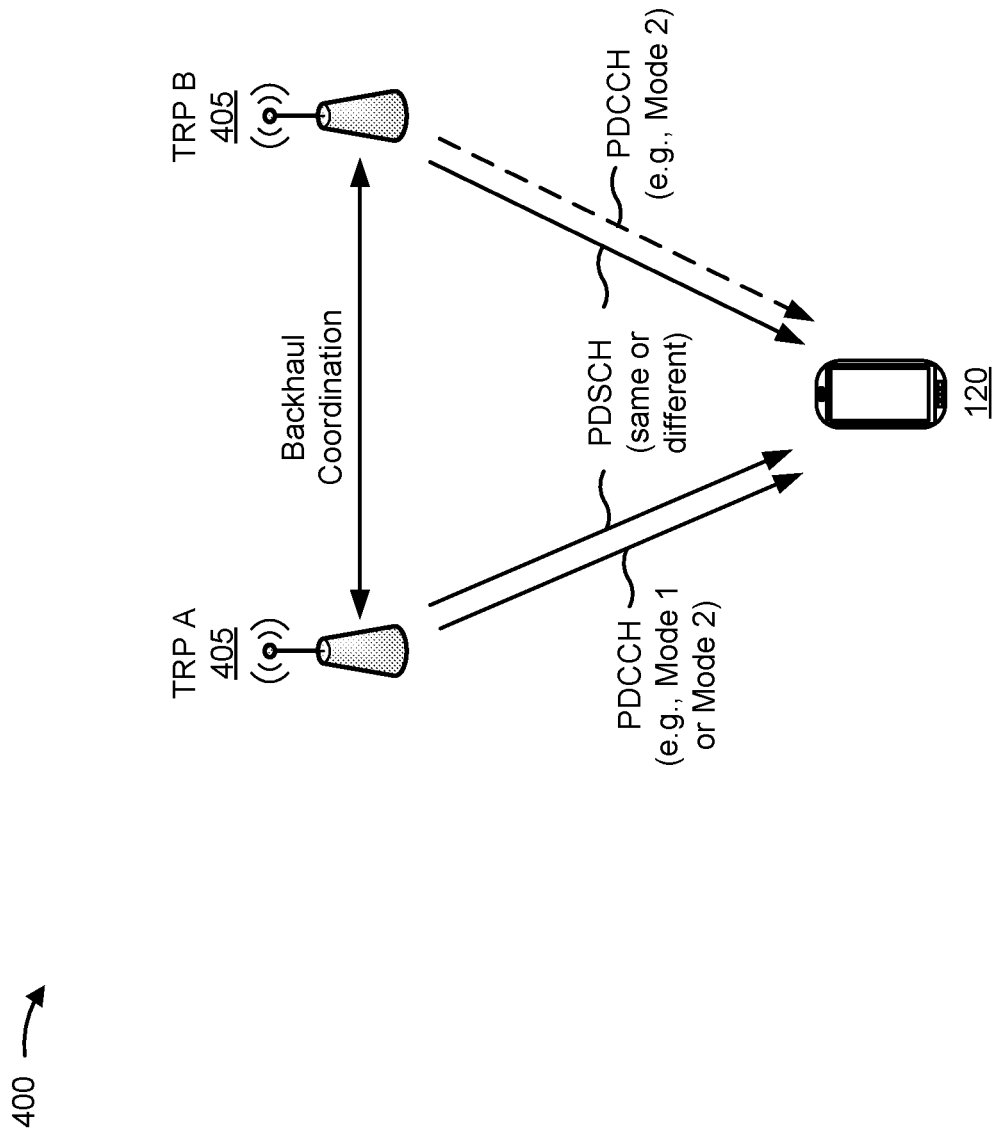

TECHNIQUES FOR REPEATING A TRANSPORT BLOCK USING SPATIAL DIVISION MULTIPLEXING

CROSS-REFERENCE TO RELATED APPLICATION

This Patent Application is a 371 national stage of PCT Application No. PCT/CN2020/085764 filed on Apr. 21, 2020, entitled "TECHNIQUES FOR REPEATING A TRANSPORT BLOCK USING SPATIAL DIVISION MULTIPLEXING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for repeating a transport block (TB) using spatial division multiplexing (SDM).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include transmitting, to a base station, an indication that the UE is capable of transmitting or receiving transport block (TB) repetitions using spatial division multiplexing (SDM); receiving, from the base station and based at least in part on the indication, at least one downlink control information (DCI) message that schedules a TB in a first resource and a repetition of the TB in a second resource, the first resource and the second resource at least partially overlapping in a time domain and a frequency domain; and communicating the TB and the repetition of the TB using different antenna panels according to the at least one DCI message.

In some aspects, a UE for wireless communication may include a memory and one or more processors operatively coupled to the memory. The memory and the one or more processors may be configured to transmit, to a base station, an indication that the UE is capable of transmitting or receiving TB repetitions using SDM; receive, from the base station and based at least in part on the indication, at least one DCI message that schedules a TB in a first resource and a repetition of the TB in a second resource, the first resource and the second resource at least partially overlapping in a time domain and a frequency domain; and communicate the TB and the repetition of the TB using different antenna panels according to the at least one DCI message.

In some aspects, a non-transitory computer-readable medium may store one or more instructions for wireless communication. The one or more instructions, when executed by one or more processors of a UE, may cause the one or more processors to transmit, to a base station, an indication that the UE is capable of transmitting or receiving TB repetitions using SDM; receive, from the base station and based at least in part on the indication, at least one DCI message that schedules a TB in a first resource and a repetition of the TB in a second resource, the first resource and the second resource at least partially overlapping in a time domain and a frequency domain; and communicate the TB and the repetition of the TB using different antenna panels according to the at least one DCI message.

In some aspects, an apparatus for wireless communication may include means for transmitting, to a base station, an indication that the apparatus is capable of transmitting or receiving TB repetitions using SDM; means for receiving, from the base station and based at least in part on the indication, at least one DCI message that schedules a TB in a first resource and a repetition of the TB in a second resource, the first resource and the second resource at least partially overlapping in a time domain and a frequency domain; and means for communicating the TB and the repetition of the TB using different antenna panels according to the at least one DCI message.

In some aspects, the indication indicates that the UE is capable of transmitting or receiving TB repetitions in a plurality of codewords scheduled by a single DCI message.

In some aspects, the at least one DCI message is a single DCI message that schedules a transmission of a first codeword and a second codeword. In some aspects, the second codeword is a repetition of the first codeword. In some aspects, the first codeword is to be used for the TB and the second codeword is to be used for the repetition of the TB. In some aspects, a TB size associated with the transmission is based at least in part on the first codeword.

In some aspects, the method includes receiving a configuration that enables TB repetitions using SDM scheduled by a single DCI message.

In some aspects, the at least one DCI message indicates that TB repetitions using SDM are scheduled by the at least one DCI message. In some aspects, a radio network temporary identifier (RNTI) associated with the at least one DCI message indicates that TB repetitions using SDM are scheduled by the at least one DCI message.

In some aspects, the indication indicates that the UE is capable of transmitting or receiving TB repetitions scheduled by a plurality of DCI messages.

In some aspects, the at least one DCI message includes a first DCI message and a second DCI message, and the first DCI message is associated with a first control resource set (CORESET) associated with a first CORESET pool index, and the second DCI message is associated with a second CORESET associated with a second CORESET pool index.

In some aspects, the at least one DCI message includes a first DCI message and a second DCI message, and the first DCI message schedules a transmission of a first codeword and the second DCI message schedules a transmission of a second codeword. In some aspects, the second codeword is a repetition of the first codeword.

In some aspects, the at least one DCI message includes a first DCI message and a second DCI message, and the first DCI message and the second DCI message identify a same hybrid automatic repeat request (HARD) process identifier, a same TB size, a same new data indicator (NDI) value, and different beam indications.

In some aspects, the method includes receiving a configuration that enables TB repetitions using SDM scheduled by a plurality of DCI messages.

In some aspects, a method of wireless communication, performed by a base station, may include receiving, from a UE, an indication that the UE is capable of transmitting or receiving TB repetitions using SDM; transmitting, to the UE and based at least in part on the indication, at least one DCI message that schedules a TB in a first resource and a repetition of the TB in a second resource, the first resource and the second resource at least partially overlapping in a time domain and a frequency domain; and communicating the TB and the repetition of the TB according to the at least one DCI message.

In some aspects, a base station for wireless communication may include a memory and one or more processors operatively coupled to the memory. The memory and the one or more processors may be configured to receive, from a UE, an indication that the UE is capable of transmitting or receiving TB repetitions using SDM; transmit, to the UE and based at least in part on the indication, at least one DCI message that schedules a TB in a first resource and a repetition of the TB in a second resource, the first resource and the second resource at least partially overlapping in a time domain and a frequency domain; and communicate the TB and the repetition of the TB according to the at least one DCI message.

In some aspects, a non-transitory computer-readable medium may store one or more instructions for wireless communication. The one or more instructions, when executed by one or more processors of a base station, may cause the one or more processors to receive, from a UE, an indication that the UE is capable of transmitting or receiving TB repetitions using SDM; transmit, to the UE and based at least in part on the indication, at least one DCI message that schedules a TB in a first resource and a repetition of the TB in a second resource, the first resource and the second resource at least partially overlapping in a time domain and a frequency domain; and communicate the TB and the repetition of the TB according to the at least one DCI message.

In some aspects, an apparatus for wireless communication may include means for receiving, from a UE, an indication that the UE is capable of transmitting or receiving TB repetitions using SDM; means for transmitting, to the UE and based at least in part on the indication, at least one DCI message that schedules a TB in a first resource and a repetition of the TB in a second resource, the first resource and the second resource at least partially overlapping in a time domain and a frequency domain; and means for communicating the TB and the repetition of the TB according to the at least one DCI message.

In some aspects, the indication indicates that the UE is capable of transmitting or receiving TB repetitions in a plurality of codewords scheduled by a single DCI message.

In some aspects, the at least one DCI message is a single DCI message that schedules a transmission of a first codeword and a second codeword. In some aspects, the second codeword is a repetition of the first codeword. In some aspects, the first codeword is to be used for the TB and the second codeword is to be used for the repetition of the TB. In some aspects, a TB size associated with the transmission is based at least in part on the first codeword.

In some aspects, the method includes transmitting a configuration that enables TB repetitions using SDM scheduled by a single DCI message.

In some aspects, the at least one DCI message indicates that TB repetitions using SDM are scheduled by the at least one DCI message. In some aspects, an RNTI associated with the at least one DCI message indicates that TB repetitions using SDM are scheduled by the at least one DCI message.

In some aspects, the indication indicates that the UE is capable of transmitting or receiving TB repetitions scheduled by a plurality of DCI messages.

In some aspects, the at least one DCI message includes a first DCI message and a second DCI message, and the first DCI message is associated with a first CORESET associated with a first CORESET pool index, and the second DCI message is associated with a second CORESET associated with a second CORESET pool index.

In some aspects, the at least one DCI message includes a first DCI message and a second DCI message, and the first DCI message schedules a transmission of a first codeword and the second DCI message schedules a transmission of a second codeword. In some aspects, the second codeword is a repetition of the first codeword.

In some aspects, the at least one DCI message includes a first DCI message and a second DCI message, and the first DCI message and the second DCI message identify a same HARQ process identifier, a same TB size, a same NDI value, and different beam indications.

In some aspects, the method includes transmitting a configuration that enables TB repetitions using SDM scheduled by a plurality of DCI messages.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of multi-TRP communication, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
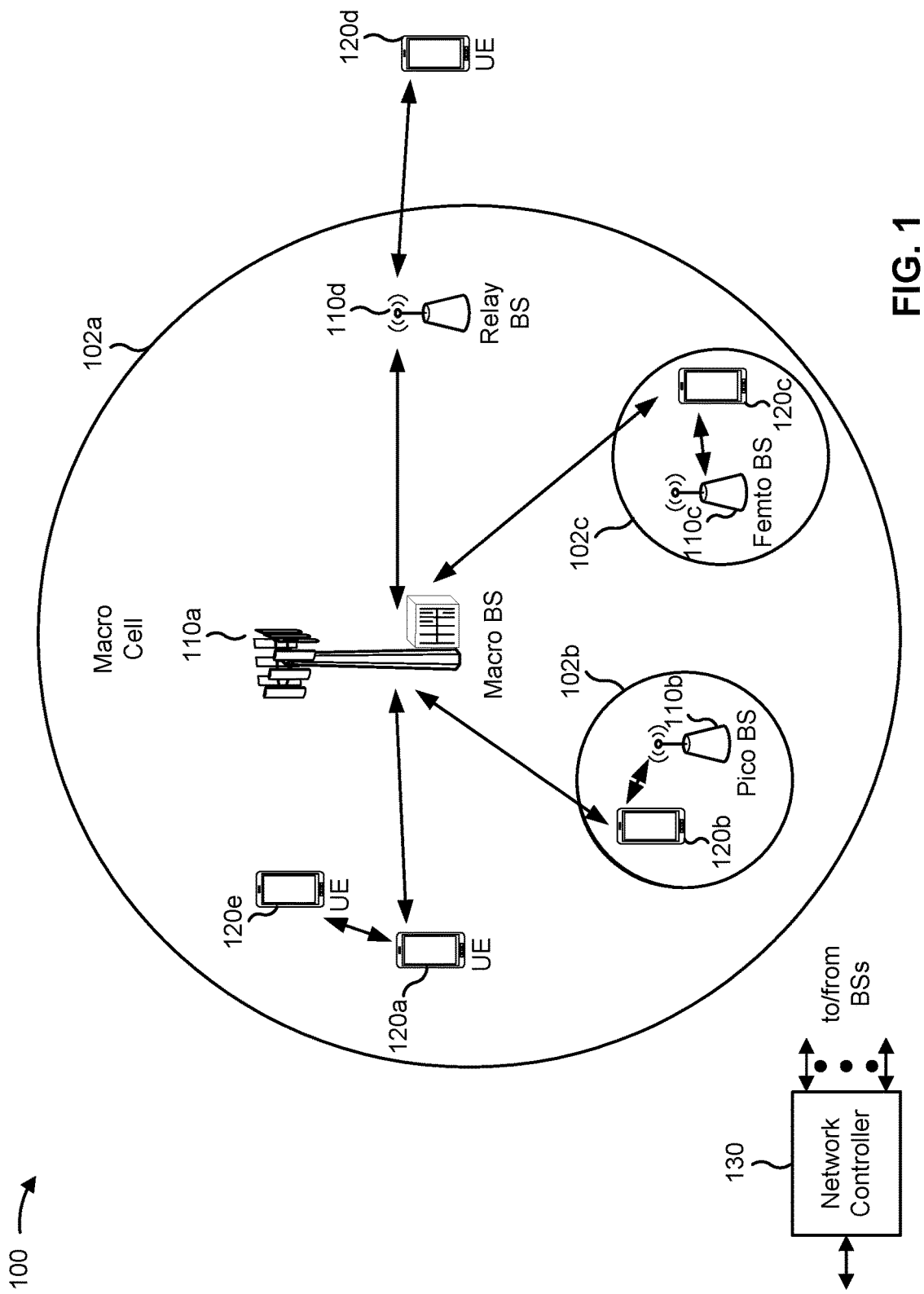
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
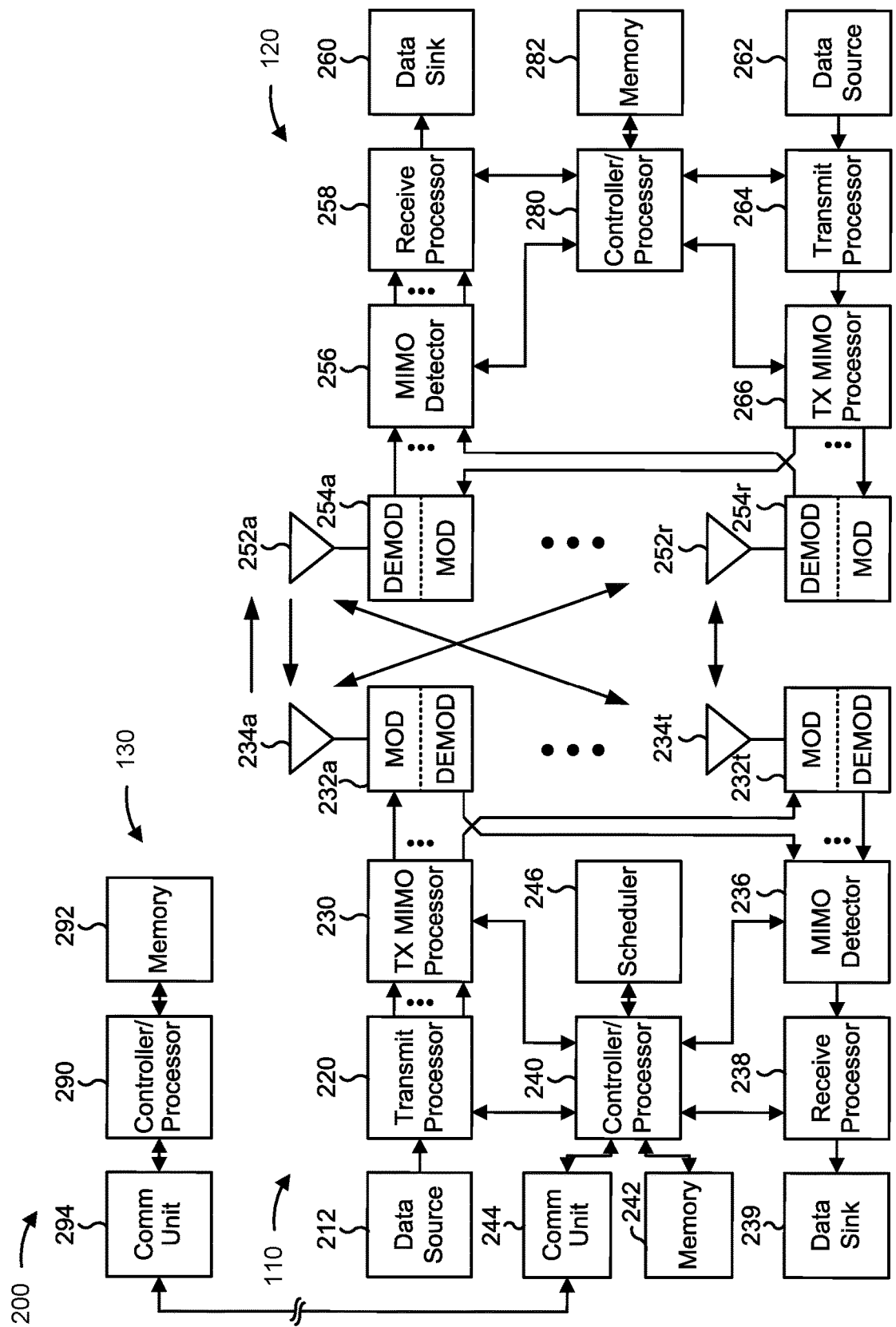
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with repeating a TB using SDM, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for transmitting an indication that the UE 120 is capable of transmitting or receiving TB repetitions using SDM, means for receiving, and based at least in part on the indication, at least one DCI message that schedules a TB in a first resource and a repetition of the TB in a second resource, the first resource and the second resource at least partially overlapping in a time domain and a frequency domain, means for communicating the TB and the repetition of the TB using different antenna panels according to the at least one DCI message, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication that a UE is capable of transmitting or receiving TB repetitions using SDM, means for transmitting, and based at least in part on receiving the indication, at least one DCI message that schedules a TB in a first resource and a repetition of the TB in a second resource, the first resource and the second resource at least partially overlapping in a time domain and a frequency domain, means for communicating the TB and the repetition of the TB according to the at least one DCI message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
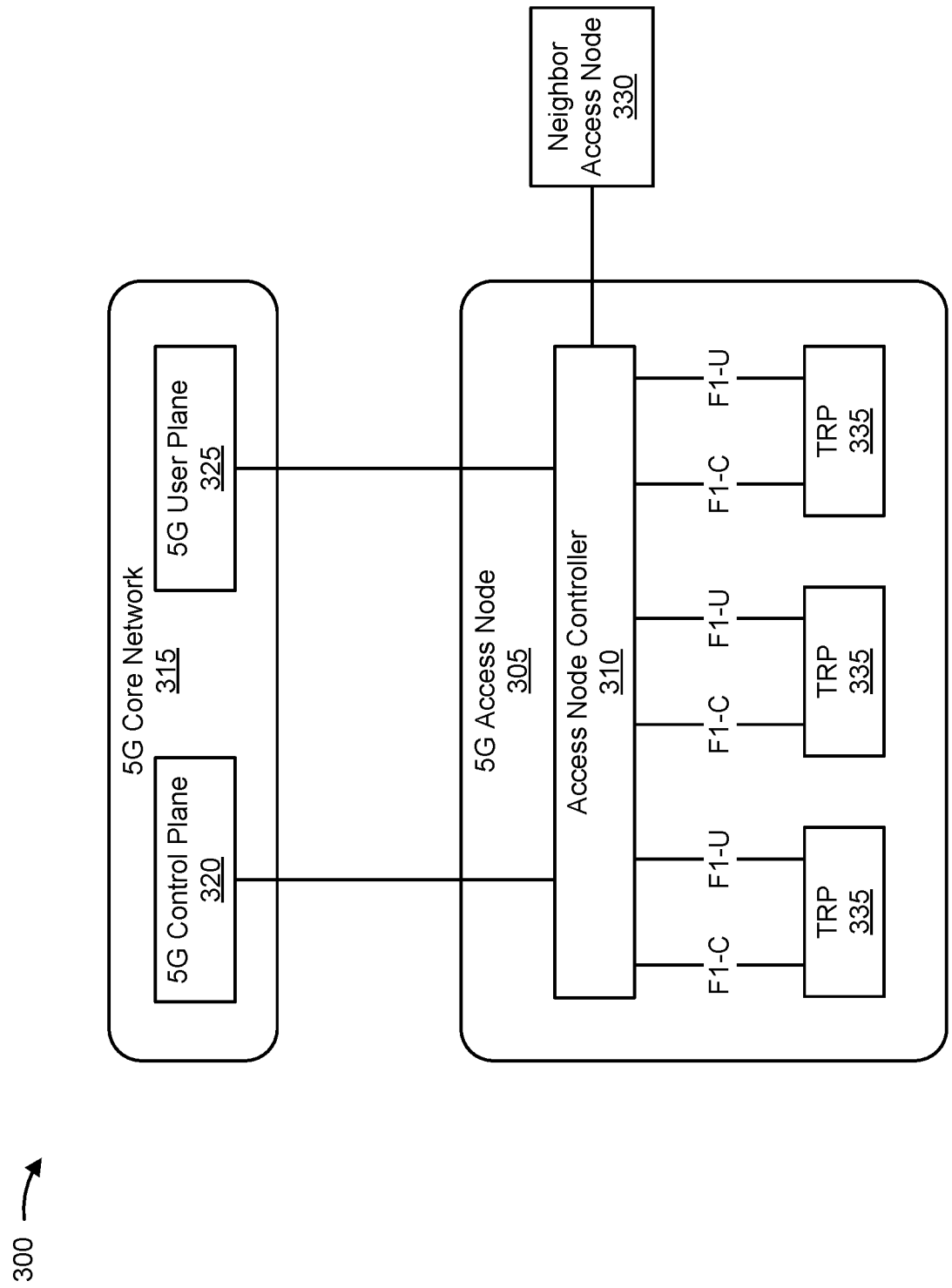
FIG. 3 is a diagram illustrating an example logical architecture of a distributed radio access network (RAN), according to aspects of the present disclosure.

FIG. 3 is a diagram illustrating an example logical architecture of a distributed RAN 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1

Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

FIG. 4 is a diagram illustrating an example 400 of multi-TRP communication (sometimes referred to as multi-panel communication), in accordance with various aspects of the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

A UE may use a plurality of antenna panels to perform concurrent (e.g., simultaneous) uplink transmissions or receive concurrent (e.g., simultaneous) downlink transmissions. The use of a plurality of antenna panels for concurrent transmissions may be referred to as a non-coherent joint transmission or spatial division multiplexing (SDM). In some wireless networks, TB repetition may be used to improve performance of transmissions, reliability of transmissions, and/or the like. However, wireless networks generally lack support for techniques to signal, configure, indicate, schedule, or otherwise enable TB repetition using SDM.

Accordingly, some techniques and apparatuses described herein provide a framework for TB repetition using SDM. For example, as described herein, a UE may transmit a capability report to a base station indicating that the UE supports transmitting or receiving TB repetitions using SDM, and the base station may provide the UE with a high-level configuration to enable TB repetitions using SDM (e.g., via radio resource control (RRC) signaling). Accordingly, the base station may then transmit, to the UE, a single DCI message, or a plurality of DCI messages, that schedule TB repetitions in resources that at least partially overlap in a time domain and a frequency domain, and the UE may communicate (e.g., transmit or receive) the TB repetitions according to the DCI message(s).

FIGS. 5A-5D are diagrams illustrating one or more examples 500 of repeating a TB using SDM, in accordance with various aspects of the present disclosure. As shown in FIGS. 5A-5D, a base station 110 and a UE 120 may communicate with one another. In some aspects, the UE 120 may employ a plurality of transmit antenna panels (e.g., a plurality of physical uplink shared channel (PUSCH) antenna port groups) and/or a plurality of receive antenna panels (e.g., a plurality of PDSCH antenna port groups). In some aspects, the UE 120 may communicate with a plurality of TRPs (e.g., a plurality of antenna panels) associated with the base station 110. In some aspects, the plurality of TRPs may be associated with more than one base station.

Figure 5A:
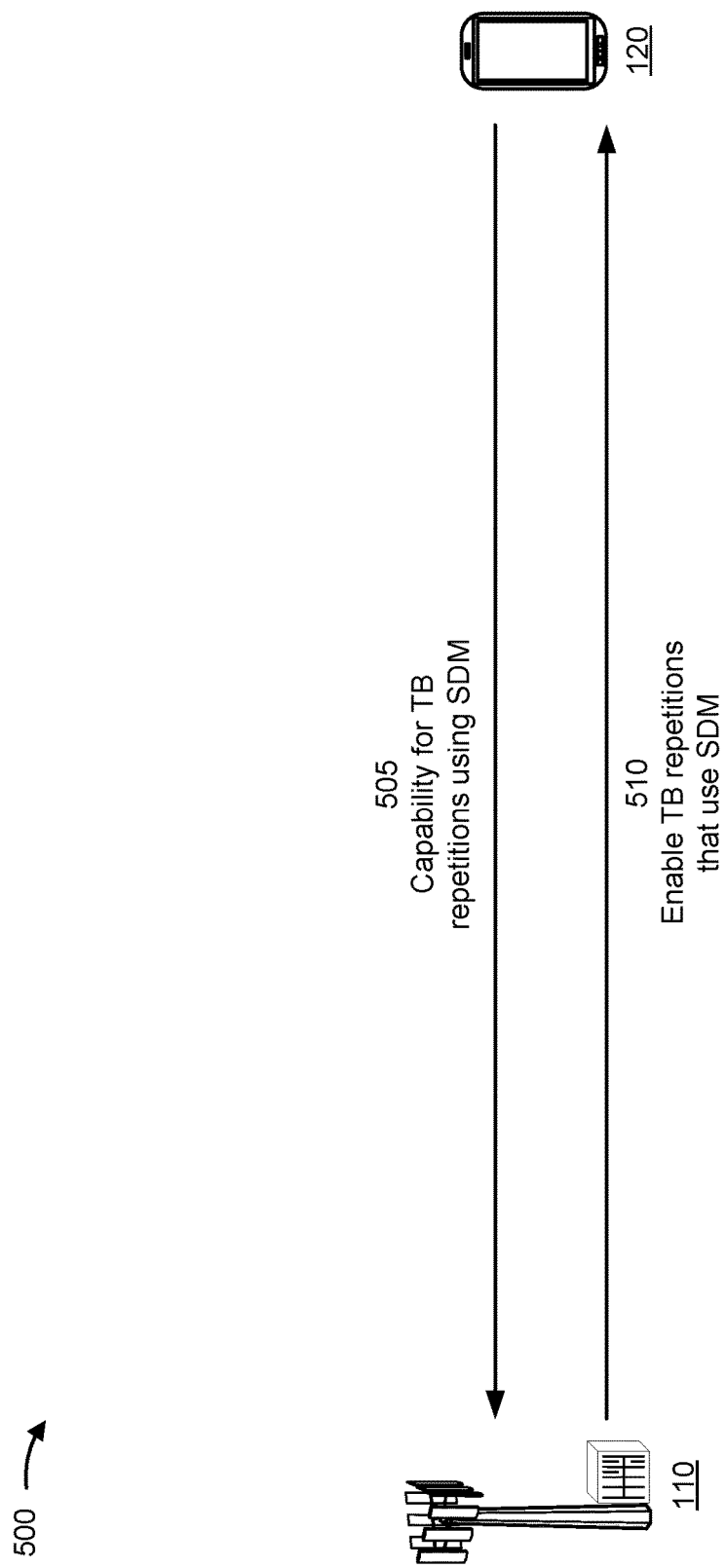
FIGS. 5A-5D are diagrams illustrating one or more examples of repeating a TB using SDM, in accordance with various aspects of the present disclosure.

As shown in FIG. 5A, and by reference number 505, the UE 120 may transmit, and the BS 110 may receive, an indication that the UE 120 is capable of transmitting and/or receiving TB repetitions using SDM. For example, the UE 120 may transmit a UE capability report indicating that the UE 120 is capable of transmitting and/or receiving TB repetitions using SDM.

In some aspects, the indication may indicate that the UE is capable of using SDM to transmit and/or receive TB repetitions scheduled by a single DCI message. That is, the indication may indicate that the UE is capable of using SDM to transmit TB repetitions using two uplink codewords (e.g., the UE may report capability for TBrepetitionby2ULCW) and/or to receive TB repetitions using two downlink codewords (e.g., the UE may report capability for TBrepetitionby2DLCW).

In some aspects, the indication may indicate that the UE is capable of using SDM to transmit and/or receive TB repetitions scheduled by a plurality of DCI messages (e.g., two DCI messages). For example, the indication may indicate that the UE is capable of using SDM to transmit TB repetitions scheduled by two uplink DCI messages (e.g., the UE may report capability for SDMby2ULDC1) and/or to receive TB repetitions scheduled by two downlink DCI messages (e.g., the UE may report capability for SDMby2DLDC1).

As shown by reference number 510, the base station 110 may transmit (e.g., via RRC signaling), and the UE 120 may receive, a configuration that enables, for the UE 120, TB repetitions that use SDM. For example, the base station 110 may transmit the configuration based at least in part on the UE 120 indicating a capability for TB repetitions that use SDM.

In some aspects, the configuration may enable TB repetitions, using SDM, scheduled by a single DCI message. For example, the configuration may set a first RRC signaling (flag1) to a first value (e.g., 1) to enable TB repetitions scheduled by a single DCI message. Similarly, the base station 110 may transmit another configuration to the UE 120 that disables TB repetitions, using SDM, scheduled by a single DCI message. For example, the configuration may set the first RRC signaling to a second value (e.g., 0) to disable TB repetitions scheduled by a single DCI message.

In some aspects, the configuration may enable TB repetitions, using SDM, scheduled by a plurality of DCI messages (e.g., two DCI messages). For example, the configuration may set a second RRC signaling (flag2) to a first value (e.g., 1) to enable TB repetitions scheduled by a plurality of DCI messages. Similarly, the base station 110 may transmit another configuration to the UE 120 that disables TB repetitions, using SDM, scheduled by a plurality of DCI messages (e.g., two DCI messages). For example, the configuration may set the second RRC signaling to a second value (e.g., 0) to disable TB repetitions scheduled by a plurality of DCI messages.

Figure 5B:
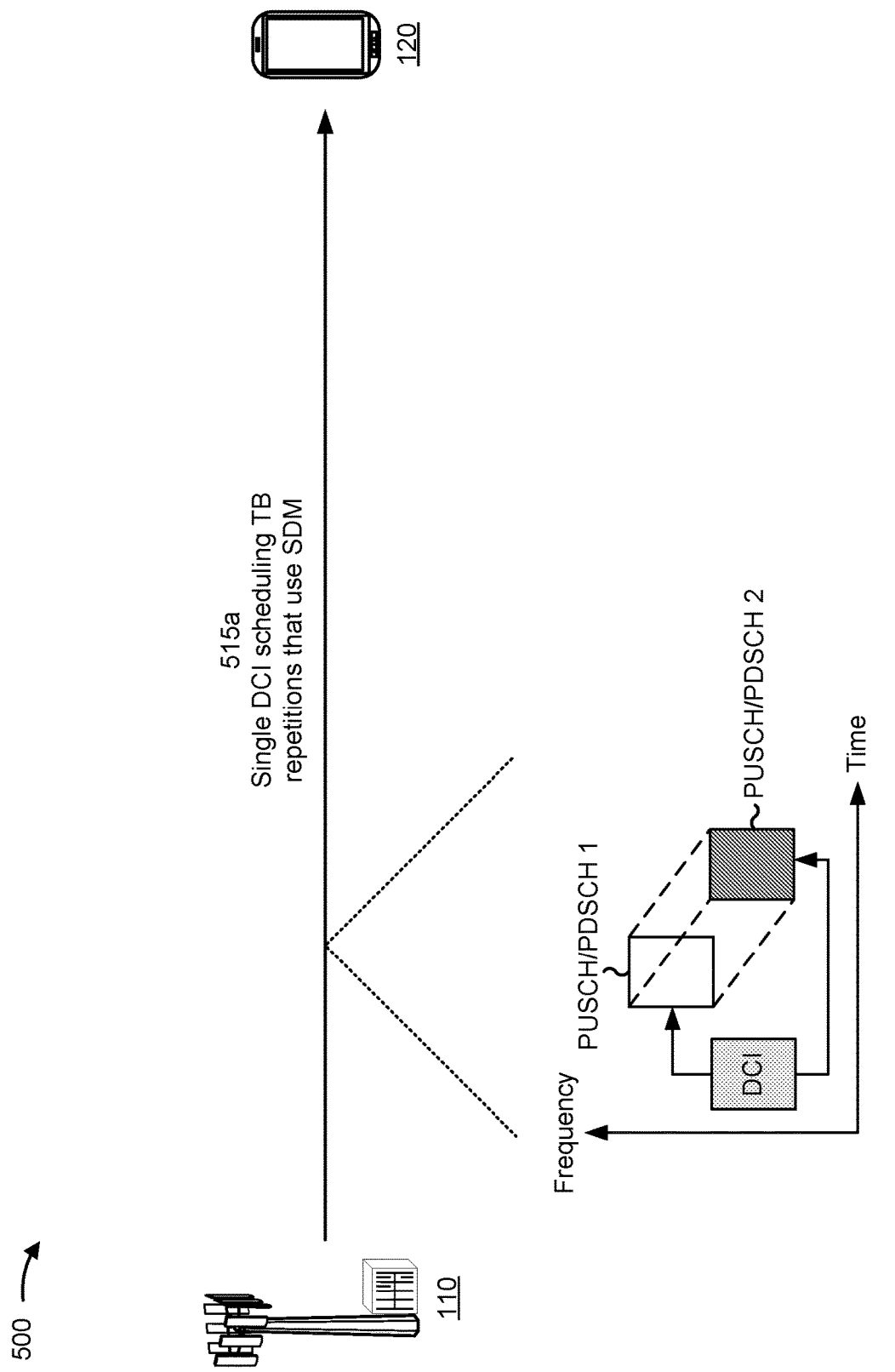

As shown in FIG. 5B, and by reference number 515a, in some aspects, the base station 110 may transmit, and the UE 120 may receive, a single DCI message that schedules a TB (e.g., an initial repetition of the TB) and at least one repetition of the TB. The single DCI message may indicate a single resource allocation for the TB and the repetition of the TB. That is, a first resource that is to be used for the TB, and a second resource that is to be used for the repetition of the TB, may overlap in a time domain and a frequency domain (e.g., the first resource and the second resource may be the same).

The base station 110 may transmit the single DCI message based at least in part on the UE 120 indicating that the UE is capable of using SDM to transmit and/or receive TB repetitions scheduled by a single DCI message. Moreover, the base station 110 may transmit the single DCI message after enabling, for the UE 120, TB repetitions scheduled by a single DCI message.

In some aspects, the base station 110 may transmit a message indicating that a maximum number of codewords scheduled by the single DCI message is more than one (e.g., two codewords). For example, an RRC message may indicate (e.g., using a maxNrofULCodeWordsScheduledByDCI parameter) that a maximum number of uplink codewords scheduled by the DCI message is two uplink codewords. As another example, an RRC message may indicate (e.g., using a maxNrofDLCodeWordsScheduledByDCI parameter) that a maximum number of downlink codewords scheduled by the DCI message is two downlink codewords.

In some aspects, the single DCI message may schedule transmission of at least a first codeword and a second codeword. For example, a single uplink DCI message may schedule a first uplink codeword and a second uplink codeword, and the second uplink codeword may be a repetition of the first uplink codeword. As another example, a single downlink DCI message may schedule a first downlink codeword and a second downlink codeword, and the second downlink codeword may be a repetition of the first downlink codeword.

In some aspects, the single DCI message may indicate first parameters (e.g., a first new data indicator (NDI) value, a first MCS, a first redundancy version (RV), and/or the like) for the first codeword, and second parameters (e.g., a second NDI value, a second MCS, a second RV, and/or the like) for the second codeword. In addition, the single DCI message may indicate a first beam indication for the first codeword and a second beam indication for the second codeword. For example, the single DCI message may indicate respective transmission configuration indicator (TCI) states, respective sounding reference signal (SRS) resource indicators (SRIs), respective SRS resource set indicators, and/or the like, for the beam indications for the first codeword and the second codeword.

Moreover, a demodulation reference signal (DMRS) antenna port indication of the single DCI message may be used for the first codeword and the second codeword. For example, the DMRS antenna port indication may be associated with two or more DMRS code division multiplexing (CDM) groups (e.g., when the single DCI message schedules more than one codeword). In this case, a first DMRS CDM group may be associated with the first codeword, and the remaining DMRS CDM groups (e.g., a second DMRS CDM group, and so forth) may be associated with the second codeword.

In some aspects, the single DCI message may support an association of the TB and the repetition of the TB. For example, the first codeword may be used for the TB and the second codeword may be used for the repetition of the TB. In some aspects, a TB size associated with the TB and the repetition of the TB is the same (e.g., TB sizes are not determined independently for the TB and the repetition of the TB). In this case, a TB size for the transmission of the first codeword and the second codeword may be based at least in part on the first codeword (e.g., a TB size for the second codeword is the same as the first codeword).

Accordingly, the single DCI message may schedule a first PUSCH or PDSCH transmission (shown as PUSCH/PDSCH 1) and a second PUSCH or PDSCH transmission (shown as PUSCH/PDSCH 2). The first PUSCH/PDSCH transmission may be associated with the first codeword and may be scheduled for transmission or reception using a first antenna panel of the UE 120 and a first beam. The second PUSCH/PDSCH transmission may be associated with the second codeword and may be scheduled for transmission or reception using a second antenna panel of the UE 120 and a second beam.

In some aspects, the single DCI message may provide an indication (e.g., a dynamic indication) that the single DCI message schedules TB repetitions that use SDM (rather than schedules different TBs that use SDM). For example, a reserved value for one or more fields in the single DCI message may indicate that the single DCI message schedules TB repetitions that use SDM. As an example, the single DCI message may toggle (e.g., set) an NDI associated with the second codeword (e.g., to indicate new data), and identify an MCS for the second codeword that indicates a retransmission (e.g., the MCS is associated with a modulation order indication but not a coding rate indication, such as MCS 28, 29, 30, or 31 identified in 3GPP Technical Specification 38.214, table 6.1.4.1-1). In other words, the UE 120 may determine that the single DCI message indicates the scheduling of TB repetitions using SDM based at least in part on a determination that the DCI indicates an invalid combination of an NDI value and an MCS for the second codeword (e.g., the combination indicates new data and a retransmission).

In some aspects, a radio network temporary identifier (RNTI) associated with the single DCI message may provide an indication (e.g., a dynamic indication) that the single DCI message schedules TB repetitions that use SDM (rather than schedules different TBs that use SDM). For example, a RNTI may be defined for use with DCI associated with a maximum number of uplink or downlink codewords that is more than one codeword (e.g., two codewords). Accordingly, the UE 120 may determine that the single DCI message schedules TB repetitions that use SDM based at least in part on descrambling the DCI using the RNTI.

Figure 5C:
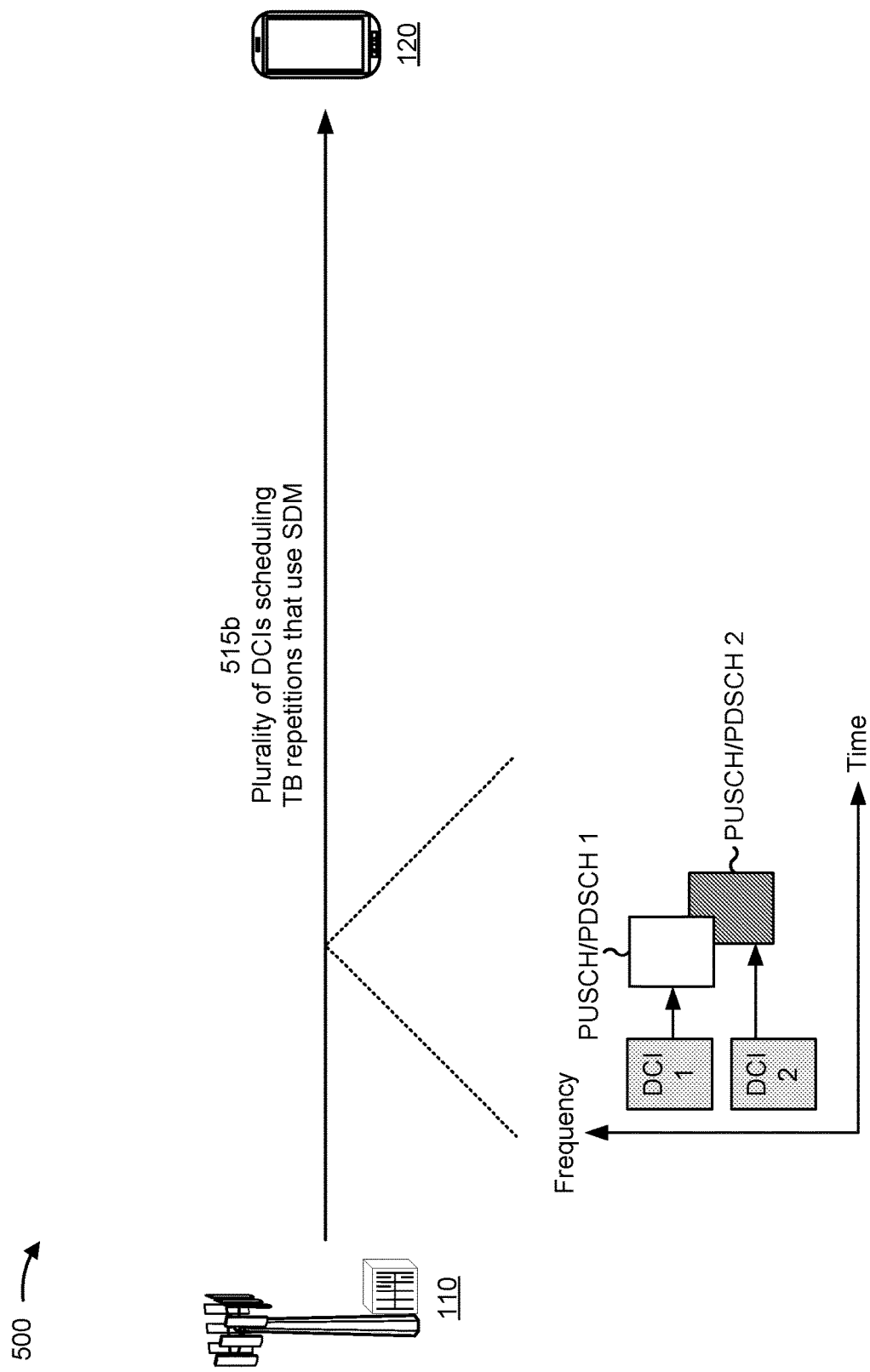

As shown in FIG. 5C, and by reference number 515b, in some aspects, the base station 110 may transmit, and the UE 120 may receive, a plurality of DCI messages (e.g., two DCI messages) that schedule a TB (e.g., an initial repetition of the TB) and at least one repetition of the TB. The plurality of DCI messages may indicate respective resource allocations for the TB and the repetition of the TB. That is, a first resource that is to be used for the TB, and a second resource that is to be used for the repetition of the TB, may at least partially overlap (e.g., partially overlap or fully overlap) in a time domain and a frequency domain.

The base station 110 may transmit the plurality of DCI messages based at least in part on the UE 120 indicating that the UE is capable of using SDM to transmit and/or receive TB repetitions scheduled by a plurality of DCI messages. Moreover, the base station 110 may transmit the plurality of DCI messages after enabling, for the UE 120, TB repetitions scheduled by a plurality of DCI message.

In some aspects, prior to receiving the plurality of DCI messages, the UE 120 may receive, from the base station 110, a control resource set (CORESET) configuration (e.g., a configuration for a ControlResourceSet parameter) that includes at least two different CORESET pool index (e.g., CORESETPoolIndex) values. The configuration may be a PDCCH configuration (e.g., a configuration for the higher-layer parameter PDCCH-Config).

In some aspects, the plurality of DCI messages may include a first DCI message and a second DCI message. The first DCI message may be associated with a first CORESET associated with a first CORESET pool index value (e.g., 0). That is, the UE 120 may receive the first DCI message in the first CORESET associated with the first CORESET pool index value. The second DCI message may be associated with a second CORESET associated with a second CORESET pool index value (e.g., 1). That is, the UE 120 may receive the second DCI message in the second CORESET associated with the second CORESET pool index value.

In some aspects, the first DCI message may schedule transmission of a first codeword and the second DCI message schedule transmission of a second codeword. For example, a first uplink DCI message may schedule a first uplink codeword, a second uplink DCI message may schedule a second uplink codeword, and the second uplink codeword may be a repetition of the first uplink codeword. As another example, a first downlink DCI message may schedule a first downlink codeword, a second downlink DCI message may schedule a second downlink codeword, and the second downlink codeword may be a repetition of the first downlink codeword.

In some aspects, the first and second DCI messages may support an association of the TB and the repetition of the TB. For example, the first codeword scheduled by the first DCI message may be used for the TB and the second codeword scheduled by the second DCI message may be used for the repetition of the TB. In some aspects, the first and second DCI messages may indicate one or more of the same parameters (e.g., the same hybrid automatic repeat request (HARD) process identifier, the same TB size, the same NDI value, and/or the like) for the first codeword (e.g., for the TB) and the second codeword (e.g., for the repetition of the TB). In some aspects, the first and second DCI messages may indicate respective beam indications for the first codeword (e.g., for the TB) and the second codeword (e.g., for the repetition of the TB). For example, the first DCI message may indicate a first TCI state, SRI, SRS resource set indicator, and/or the like, for the first codeword, and the second DCI message may indicate a second TCI state, SRI, SRS resource set indicator, and/or the like, for the second codeword.

Accordingly, the plurality of DCI messages may schedule a first PUSCH or PDSCH transmission (shown as PUSCH/PDSCH 1) and a second PUSCH or PDSCH transmission (shown as PUSCH/PDSCH 2). The first PUSCH/PDSCH transmission may be associated with the first codeword scheduled by the first DCI message, and may be scheduled for transmission or reception using a first antenna panel of the UE 120 and a first beam. The second PUSCH/PDSCH transmission may be associated with the second codeword scheduled by the second DCI message, and may be scheduled for transmission or reception using a second antenna panel of the UE 120 and a second beam.

Figure 5D:
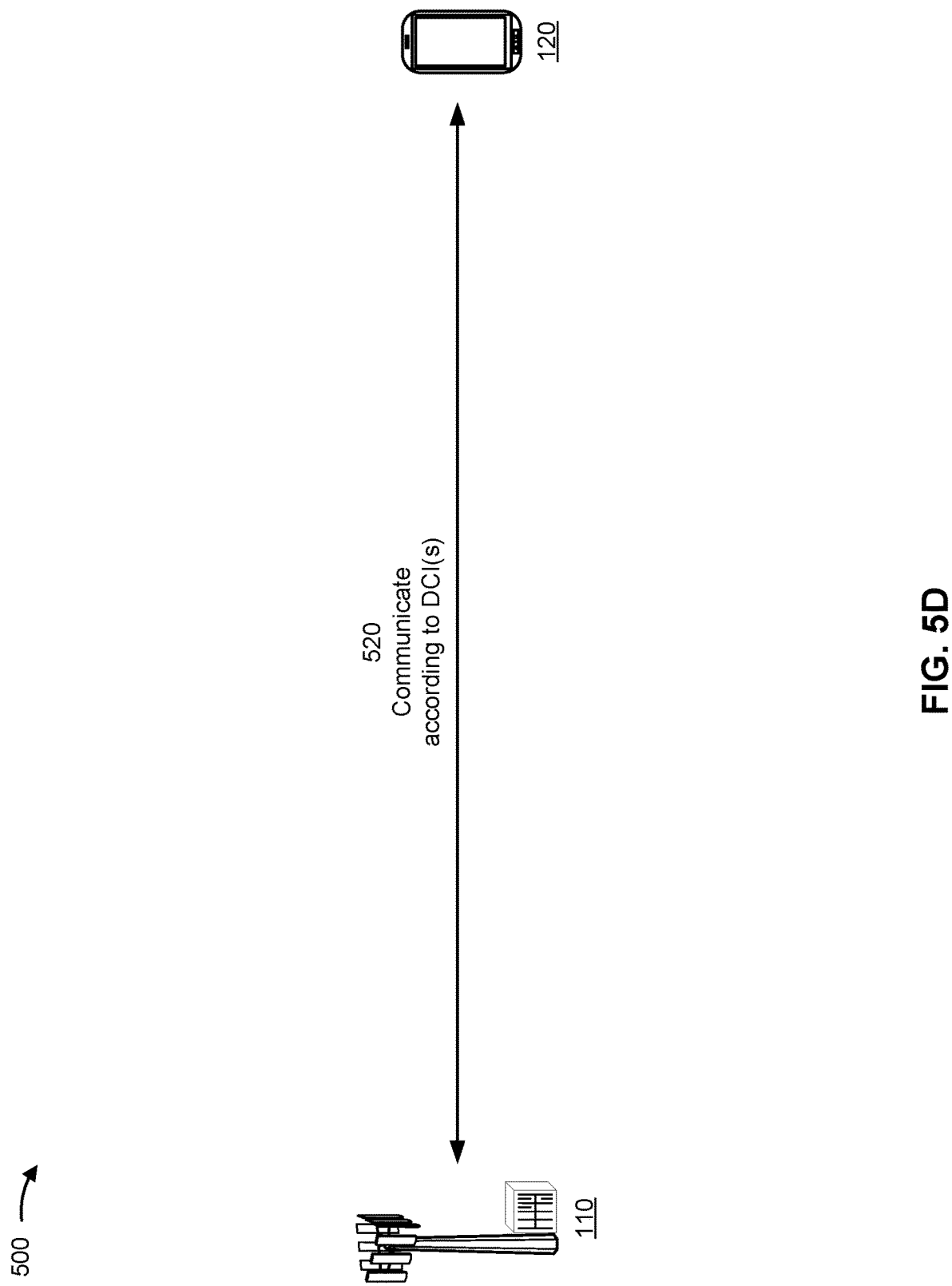

As shown in FIG. 5D, and by reference number 520, the base station 110 and the UE 120 may communicate according to the single DCI message or the plurality of DCI messages. The base station 110 and the UE 120 may both communicate using a plurality of antenna panels.

In some aspects, the base station 110 may transmit, and the UE 120 may receive, downlink TB repetitions according to the single DCI message or the plurality of DCI messages. In this case, the UE 120 may receive the downlink TB repetitions using a plurality of antenna panels. For example, the UE 120 may receive the TB (e.g., an initial repetition of the TB) using a first antenna panel and a first beam, and receive the repetition of the TB using a second antenna panel and a second beam. In some aspects, the UE 120 may receive the TB from a first TRP (e.g., associated with the base station 110) and receive the repetition of the TB from a second TRP (e.g., associated with the base station 110 or another base station).

In some aspects, the UE 120 may transmit, and the base station 110 may receive, uplink TB repetitions according to the single DCI message or the plurality of DCI messages. In this case, the UE 120 may transmit the uplink TB repetitions using a plurality of antenna panels. For example, the UE 120 may transmit the TB (e.g., an initial repetition of the TB) using a first antenna panel and a first beam, and transmit the repetition of the TB using a second antenna panel and a second beam. In some aspects, the UE 120 may transmit the TB to a first TRP (e.g., associated with the base station 110) and transmit the repetition of the TB to a second TRP (e.g., associated with the base station 110 or another base station).

As indicated above, FIGS. 5A-5D are provided as one or more examples. Other examples may differ from what is described with respect to FIGS. 5A-5D.

Figure 6:
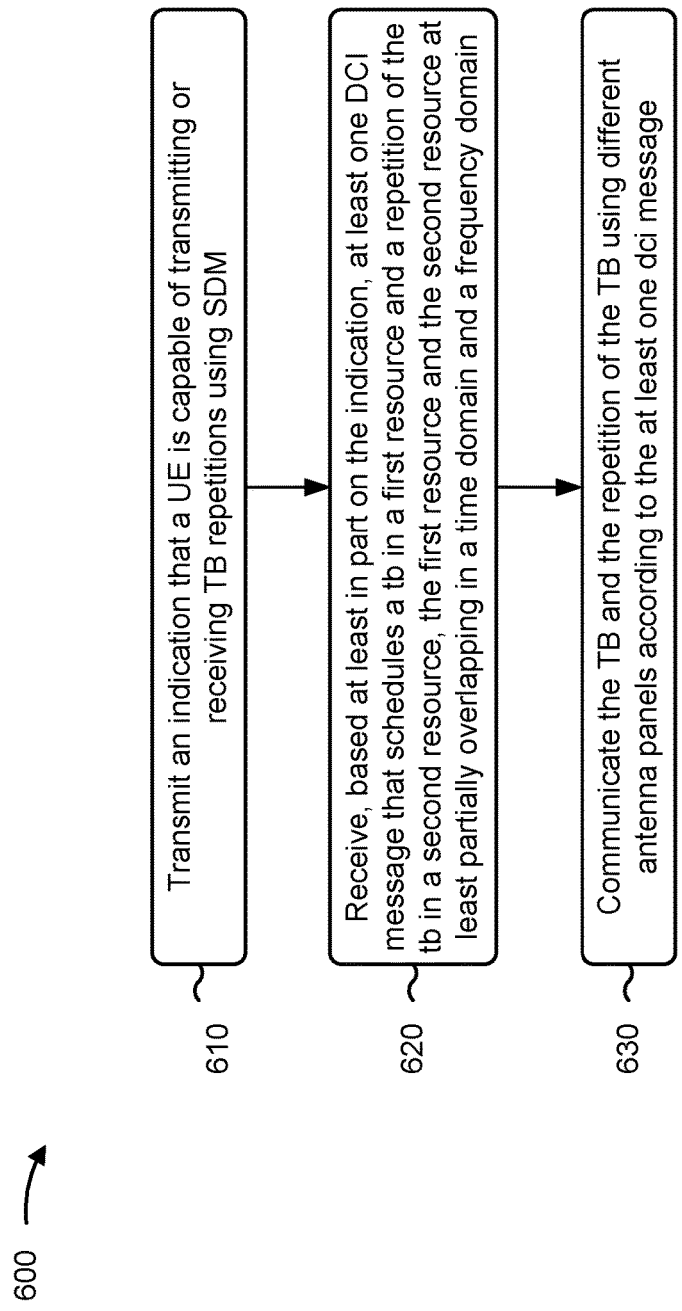
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120 and/or the like) performs operations associated with repeating a TB using SDM.

As shown in FIG. 6, in some aspects, process 600 may include transmitting an indication that the UE is capable of transmitting or receiving TB repetitions using SDM (block 610). For example, the UE (e.g., using controller/processor 280, transmit processor 264, TX MIMO processor 266, MOD 254, antenna 252, and/or the like) may transmit an indication that the UE is capable of transmitting or receiving TB repetitions using SDM, as described above.

As further shown in FIG. 6, in some aspects, process 600 may include receiving, based at least in part on the indication, at least one DCI message that schedules a TB in a first resource and a repetition of the TB in a second resource, the first resource and the second resource at least partially overlapping in a time domain and a frequency domain (block 620). For example, the UE (e.g., using antenna 252, DEMOD 254, MIMO detector 258, receive processor 258, controller/processor 280, and/or the like) may receive, based at least in part on the indication, at least one DCI message that schedules a TB in a first resource and a repetition of the TB in a second resource, the first resource and the second resource at least partially overlapping in a time domain and a frequency domain, as described above.

As further shown in FIG. 6, in some aspects, process 600 may include communicating the TB and the repetition of the TB using different antenna panels according to the at least one DCI message (block 630). For example, the UE (e.g., using controller/processor 280, transmit processor 264, TX MIMO processor 266, MOD 254, antenna 252, DEMOD 254, MIMO detector 256, receive processor 258, and/or the like) may communicate the TB and the repetition of the TB using different antenna panels according to the at least one DCI message, as described above.

Process 600 may include additional aspects, such as any single aspect or any combination of aspects described below and/or in connection with one or more other processes described elsewhere herein.

In a first aspect, the indication indicates that the UE is capable of transmitting or receiving TB repetitions in a plurality of codewords scheduled by a single DCI message.

In a second aspect, alone or in combination with the first aspect, the at least one DCI message is a single DCI message that schedules a transmission of a first codeword and a second codeword.

In a third aspect, alone or in combination with one or more of the first and second aspects, the second codeword is a repetition of the first codeword.

In a fourth aspect, alone or in combination with one or more of the first through third aspects, the first codeword is to be used for the TB and the second codeword is to be used for the repetition of the TB.

In a fifth aspect, alone or in combination with one or more of the first through fourth aspects, a TB size associated with the transmission is based at least in part on the first codeword.

In a sixth aspect, alone or in combination with one or more of the first through fifth aspects, process 600 includes receiving a configuration that enables TB repetitions using SDM scheduled by a single DCI message.

In a seventh aspect, alone or in combination with one or more of the first through sixth aspects, the at least one DCI message indicates that TB repetitions using SDM are scheduled by the at least one DCI message.

In an eighth aspect, alone or in combination with one or more of the first through seventh aspects, an RNTI associated with the at least one DCI message indicates that TB repetitions using SDM are scheduled by the at least one DCI message.

In a ninth aspect, alone or in combination with one or more of the first through eighth aspects, the indication indicates that the UE is capable of transmitting or receiving TB repetitions scheduled by a plurality of DCI messages.

In a tenth aspect, alone or in combination with one or more of the first through ninth aspects, the at least one DCI message includes a first DCI message and a second DCI message, and the first DCI message is associated with a first CORESET associated with a first CORESET pool index, and the second DCI message is associated with a second CORESET associated with a second CORESET pool index.

In an eleventh aspect, alone or in combination with one or more of the first through tenth aspects, the at least one DCI message includes a first DCI message and a second DCI message, and the first DCI message schedules a transmission of a first codeword and the second DCI message schedules a transmission of a second codeword.

In a twelfth aspect, alone or in combination with one or more of the first through eleventh aspects, the second codeword is a repetition of the first codeword.

In a thirteenth aspect, alone or in combination with one or more of the first through twelfth aspects, the at least one DCI message includes a first DCI message and a second DCI message, and the first DCI message and the second DCI message identify a same HARQ process identifier, a same TB size, a same NDI value, and different beam indications.

In a fourteenth aspect, alone or in combination with one or more of the first through thirteenth aspects, process 600 includes receiving a configuration that enables TB repetitions using SDM scheduled by a plurality of DCI messages.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
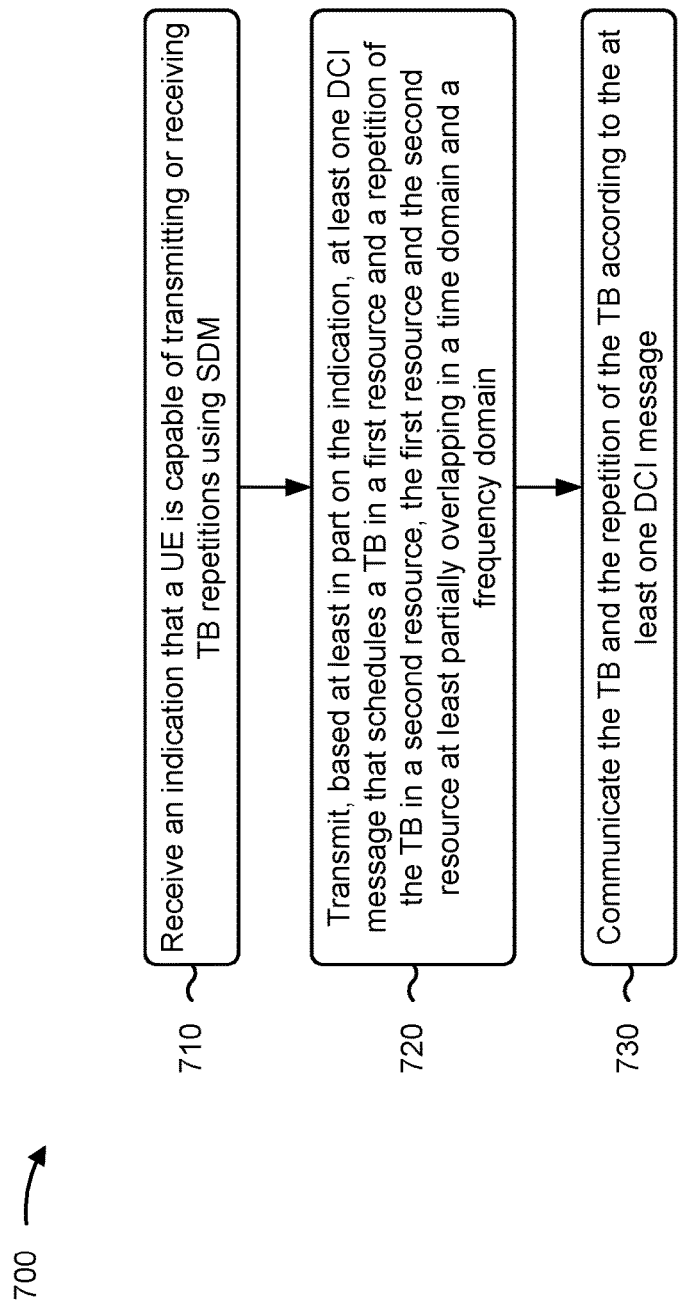
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110 and/or the like) performs operations associated with repeating a TB using SDM.

As shown in FIG. 7, in some aspects, process 700 may include receiving an indication that a UE is capable of transmitting or receiving TB repetitions using SDM (block 710). For example, the base station (e.g., using antenna 234, DEMOD 232, MIMO detector 236, receive processor 238, controller/processor 240, and/or the like) may receive an indication that a UE is capable of transmitting or receiving TB repetitions using SDM, as described above.

As further shown in FIG. 7, in some aspects, process 700 may include transmitting, based at least in part on the indication, at least one DCI message that schedules a TB in a first resource and a repetition of the TB in a second resource, the first resource and the second resource at least partially overlapping in a time domain and a frequency domain (block 720). For example, the base station (e.g., using controller/processor 240, transmit processor 220, TX MIMO processor 230, MOD 232, antenna 234, and/or the like) may transmit, based at least in part on the indication, at least one DCI message that schedules a TB in a first resource and a repetition of the TB in a second resource, the first resource and the second resource at least partially overlapping in a time domain and a frequency domain, as described above.

As further shown in FIG. 7, in some aspects, process 700 may include communicating the TB and the repetition of the TB according to the at least one DCI message (block 730). For example, the base station (e.g., using controller/processor 240, transmit processor 220, TX MIMO processor 230, MOD 232, antenna 234, DEMOD 232, MIMO detector 236, receive processor 238, and/or the like) may communicate the TB and the repetition of the TB according to the at least one DCI message, as described above.

Process 700 may include additional aspects, such as any single aspect or any combination of aspects described below and/or in connection with one or more other processes described elsewhere herein.

In a first aspect, the indication indicates that the UE is capable of transmitting or receiving TB repetitions in a plurality of codewords scheduled by a single DCI message.

In a second aspect, alone or in combination with the first aspect, the at least one DCI message is a single DCI message that schedules a transmission of a first codeword and a second codeword.

In a third aspect, alone or in combination with one or more of the first and second aspects, the second codeword is a repetition of the first codeword.

In a fourth aspect, alone or in combination with one or more of the first through third aspects, the first codeword is to be used for the TB and the second codeword is to be used for the repetition of the TB.

In a fifth aspect, alone or in combination with one or more of the first through fourth aspects, a TB size associated with the transmission is based at least in part on the first codeword.

In a sixth aspect, alone or in combination with one or more of the first through fifth aspects, process 700 includes transmitting a configuration that enables TB repetitions using SDM scheduled by a single DCI message.

In a seventh aspect, alone or in combination with one or more of the first through sixth aspects, the at least one DCI message indicates that TB repetitions using SDM are scheduled by the at least one DCI message.

In an eighth aspect, alone or in combination with one or more of the first through seventh aspects, an RNTI associated with the at least one DCI message indicates that TB repetitions using SDM are scheduled by the at least one DCI message.

In a ninth aspect, alone or in combination with one or more of the first through eighth aspects, the indication indicates that the UE is capable of transmitting or receiving TB repetitions scheduled by a plurality of DCI messages.

In a tenth aspect, alone or in combination with one or more of the first through ninth aspects, the at least one DCI message includes a first DCI message and a second DCI message, and the first DCI message is associated with a first CORESET associated with a first CORESET pool index, and the second DCI message is associated with a second CORESET associated with a second CORESET pool index.

In an eleventh aspect, alone or in combination with one or more of the first through tenth aspects, the at least one DCI message includes a first DCI message and a second DCI message, and the first DCI message schedules a transmission of a first codeword and the second DCI message schedules a transmission of a second codeword.

In a twelfth aspect, alone or in combination with one or more of the first through eleventh aspects, the second codeword is a repetition of the first codeword.

In a thirteenth aspect, alone or in combination with one or more of the first through twelfth aspects, the at least one DCI message includes a first DCI message and a second DCI message, and the first DCI message and the second DCI message identify a same HARQ process identifier, a same TB size, a same NDI value, and different beam indications.

In a fourteenth aspect, alone or in combination with one or more of the first through thirteenth aspects, process 700 includes transmitting a configuration that enables TB repetitions using SDM scheduled by a plurality of DCI messages.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
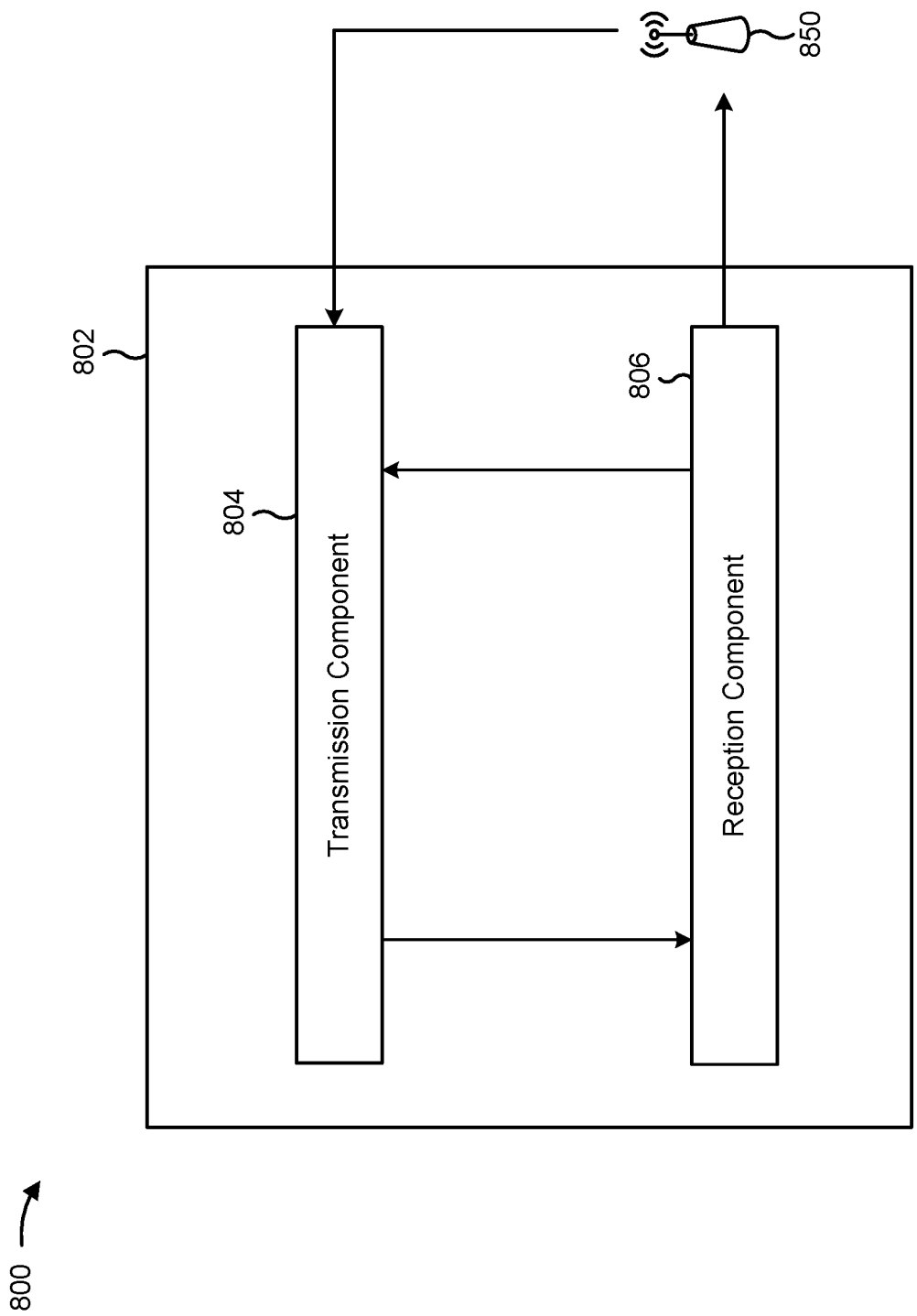
FIG. 8 is a conceptual data flow diagram illustrating the data flow between different components in an example apparatus, in accordance with various aspects of the present disclosure.

FIG. 8 is a conceptual data flow diagram 800 illustrating the data flow between different components in an example apparatus 802. The apparatus 802 may be a UE (e.g., UE 120). In some aspects, the apparatus 802 includes a transmission component 804 and/or a reception component 806.

In some aspects, transmission component 804 may transmit an indication that the apparatus 802 is capable of transmitting or receiving TB repetitions using SDM. For example, transmission component 804 may transmit the indication to an apparatus 850 (e.g., base station 110).

In some aspects, reception component 806 may receive at least one DCI message that schedules a TB in a first resource and a repetition of the TB in a second resource. For example, reception component 806 may receive the at least one DCI from the apparatus 850. The first resource and the second resource may at least partially overlap in a time domain and a frequency domain. Reception component 806 may receive the at least one DCI message based at least in part on transmission component 804 transmitting the indication.

In some aspects, transmission component 804 and/or reception component 806 may communicate the TB and the repetition of the TB according to the at least one DCI message. For example, transmission component 804 and/or reception component 806 may communicate with the apparatus 850. In some aspects, transmission component 804 may transmit the TB and the repetition of the TB. In some aspects, reception component 806 may receive the TB and the repetition of the TB.

The apparatus 802 may include additional components that perform each of the blocks of the algorithm in the aforementioned process 600 of FIG. 6, and/or the like. Each block in the aforementioned process 600 of FIG. 6, and/or the like may be performed by a component and the apparatus 802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of components (e.g., one or more components) shown in FIG. 8 may perform one or more functions described as being performed by another set of components shown in FIG. 8.

Figure 9:
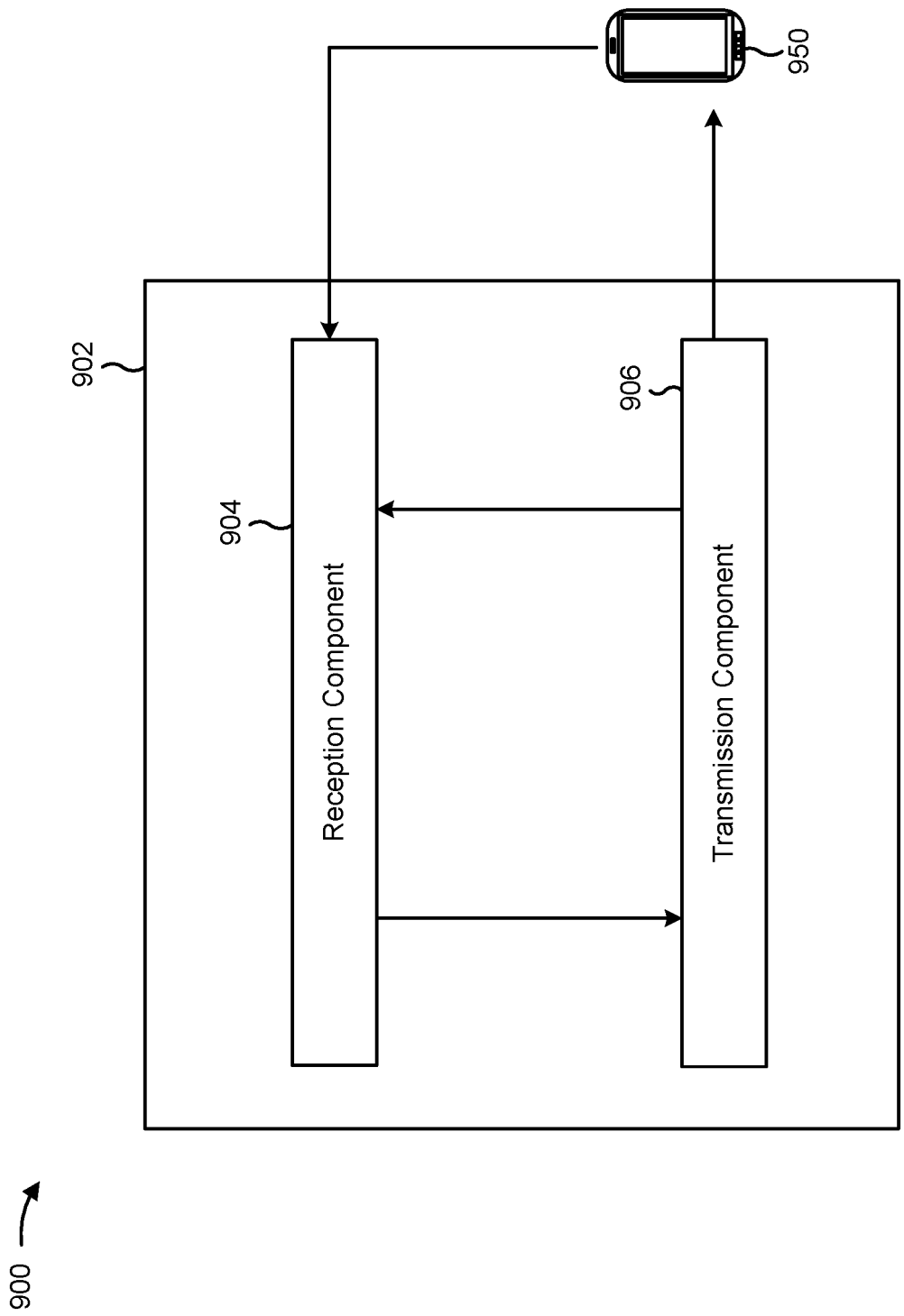
FIG. 9 is a conceptual data flow diagram illustrating the data flow between different components in an example apparatus, in accordance with various aspects of the present disclosure.

FIG. 9 is a conceptual data flow diagram 900 illustrating the data flow between different components in an example apparatus 902. The apparatus 902 may be a base station (e.g., base station 110). In some aspects, the apparatus 902 includes a reception component 904 and/or a transmission component 906.

In some aspects, reception component 904 may receive an indication that an apparatus 950 (e.g., UE 120) is capable of transmitting or receiving TB repetitions using SDM. For example, reception component 904 may receive the indication from the apparatus 950.

In some aspects, transmission component 906 may transmit at least one DCI message that schedules a TB in a first resource and a repetition of the TB in a second resource. For example, transmission component 906 may transmit the at least one DCI to the apparatus 950. The first resource and the second resource may at least partially overlap in a time domain and a frequency domain. Transmission component 906 may transmit the at least one DCI message based at least in part on reception component 904 receiving the indication.

In some aspects, reception component 904 and/or transmission component 906 may communicate the TB and the repetition of the TB according to the at least one DCI message. For example, reception component 904 and/or transmission component 906 may communicate with the apparatus 950. In some aspects, reception component 904 may receive the TB and the repetition of the TB. In some aspects, transmission component 906 may transmit the TB and the repetition of the TB.

The apparatus 902 may include additional components that perform each of the blocks of the algorithm in the aforementioned process 700 of FIG. 7, and/or the like. Each block in the aforementioned process 700 of FIG. 7, and/or the like may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, to a base station, an indication that the UE is capable of transmitting or receiving transport block (TB) repetitions using spatial division multiplexing (SDM), wherein the indication indicates that the UE is capable of transmitting or receiving TB repetitions in a plurality of codewords;
    receiving, from the base station and based at least in part on the indication, at least one downlink control information (DCI) message that schedules a TB in a first resource and a repetition of the TB in a second resource, the first resource and the second resource at least partially overlapping in a time domain and a frequency domain; and
    communicating the TB and the repetition of the TB using different antenna panels according to the at least one DCI message.

2. The method of claim 1, wherein the indication indicates that the UE is capable of transmitting or receiving TB repetitions in the plurality of codewords scheduled by a single DCI message.

3. The method of claim 1, wherein the at least one DCI message is a single DCI message that schedules a transmission of a first codeword, of the plurality of codewords, and a second codeword, of the plurality of codewords,
    wherein the second codeword is a repetition of the first codeword, and
    wherein the first codeword is to be used for the TB and the second codeword is to be used for the repetition of the TB.

4. The method of claim 3, wherein a TB size associated with the transmission is based at least in part on the first codeword.

5. The method of claim 1, further comprising:
    receiving a configuration that enables TB repetitions using SDM scheduled by a single DCI message.

6. The method of claim 1, wherein the at least one DCI message indicates that TB repetitions using SDM are scheduled by the at least one DCI message.

7. The method of claim 1, wherein the indication indicates that the UE is capable of transmitting or receiving TB repetitions scheduled by a plurality of DCI messages.

8. The method of claim 1, wherein the at least one DCI message includes a first DCI message and a second DCI message, and
    wherein the first DCI message and the second DCI message identify a same hybrid automatic repeat request process identifier, a same TB size, a same new data indicator value, and different beam indications.

9. The method of claim 1, further comprising:
    receiving a configuration that enables TB repetitions using SDM scheduled by a plurality of DCI messages.

10. A method of wireless communication performed by a base station, comprising:
    receiving, from a user equipment (UE), an indication that the UE is capable of transmitting or receiving transport block (TB) repetitions using spatial division multiplexing (SDM), wherein the indication indicates that the UE is capable of transmitting or receiving TB repetitions in a plurality of codewords;
    transmitting, to the UE and based at least in part on the indication, at least one downlink control information (DCI) message that schedules a TB in a first resource and a repetition of the TB in a second resource, the first resource and the second resource at least partially overlapping in a time domain and a frequency domain; and
    communicating the TB and the repetition of the TB according to the at least one DCI message.

11. The method of claim 10, wherein the indication indicates that the UE is capable of transmitting or receiving TB repetitions in the plurality of codewords scheduled by a single DCI message.

12. The method of claim 10, wherein the at least one DCI message is a single DCI message that schedules a transmission of a first codeword and a second codeword,
    wherein the second codeword is a repetition of the first codeword, and
    wherein the first codeword is to be used for the TB and the second codeword is to be used for the repetition of the TB.

13. The method of claim 12, wherein a TB size associated with the transmission is based at least in part on the first codeword.

14. The method of claim 10, further comprising:
    transmitting a configuration that enables TB repetitions using SDM scheduled by a single DCI message.

15. The method of claim 10, wherein the at least one DCI message indicates that TB repetitions using SDM are scheduled by the at least one DCI message.

16. The method of claim 10, wherein the indication indicates that the UE is capable of transmitting or receiving TB repetitions scheduled by a plurality of DCI messages.

17. The method of claim 10, wherein the at least one DCI message includes a first DCI message and a second DCI message, and
    wherein the first DCI message and the second DCI message identify a same hybrid automatic repeat request process identifier, a same TB size, a same new data indicator value, and different beam indications.

18. The method of claim 10, further comprising:
    transmitting a configuration that enables TB repetitions using SDM scheduled by a plurality of DCI messages.

19. A user equipment (UE) for wireless communication, comprising:
- one or more memories; and
- one or more processors operatively coupled to the one or more memories, the one or more processors configured to:
  - transmit, to a base station, an indication that the UE is capable of transmitting or receiving transport block (TB) repetitions using spatial division multiplexing (SDM), wherein the indication indicates that the UE is capable of transmitting or receiving TB repetitions in a plurality of codewords;
  - receive, from the base station and based at least in part on the indication, at least one downlink control information (DCI) message that schedules a TB in a first resource and a repetition of the TB in a second resource, the first resource and the second resource at least partially overlapping in a time domain and a frequency domain; and
  - communicate the TB and the repetition of the TB using different antenna panels according to the at least one DCI message.

20. The UE of claim 19, wherein the indication indicates that the UE is capable of transmitting or receiving TB repetitions in the plurality of codewords scheduled by a single DCI message.

21. The UE of claim 19, wherein the at least one DCI message is a single DCI message that schedules a transmission of a first codeword and a second codeword,
- wherein the second codeword is a repetition of the first codeword, and
- wherein the first codeword is to be used for the TB and the second codeword is to be used for the repetition of the TB.

22. The UE of claim 19, wherein the at least one DCI message indicates that TB repetitions using SDM are scheduled by the at least one DCI message.

23. The UE of claim 19, wherein the indication indicates that the UE is capable of transmitting or receiving TB repetitions scheduled by a plurality of DCI messages.

24. The UE of claim 19, wherein the at least one DCI message includes a first DCI message and a second DCI message, and
- wherein the first DCI message and the second DCI message identify a same hybrid automatic repeat request process identifier, a same TB size, a same new data indicator value, and different beam indications.

25. A base station for wireless communication, comprising:
- one or more memories; and
- one or more processors operatively coupled to the one or more memories, the one or more processors configured to:
  - receive, from a user equipment (UE), an indication that the UE is capable of transmitting or receiving transport block (TB) repetitions using spatial division multiplexing (SDM), wherein the indication indicates that the UE is capable of transmitting or receiving TB repetitions in a plurality of codewords;
  - transmit, to the UE and based at least in part on the indication, at least one downlink control information (DCI) message that schedules a TB in a first resource and a repetition of the TB in a second resource, the first resource and the second resource at least partially overlapping in a time domain and a frequency domain; and
  - communicate the TB and the repetition of the TB according to the at least one DCI message.

26. The base station of claim 25, wherein the indication indicates that the UE is capable of transmitting or receiving TB repetitions in the plurality of codewords scheduled by a single DCI message.

27. The base station of claim 25, wherein the at least one DCI message is a single DCI message that schedules a transmission of a first codeword and a second codeword,
- wherein the second codeword is a repetition of the first codeword, and
- wherein the first codeword is to be used for the TB and the second codeword is to be used for the repetition of the TB.

28. The base station of claim 25, wherein the at least one DCI message indicates that TB repetitions using SDM are scheduled by the at least one DCI message.

29. The base station of claim 25, wherein the indication indicates that the UE is capable of transmitting or receiving TB repetitions scheduled by a plurality of DCI messages.

30. The base station of claim 25, wherein the at least one DCI message includes a first DCI message and a second DCI message, and
- wherein the first DCI message and the second DCI message identify a same hybrid automatic repeat request process identifier, a same TB size, a same new data indicator value, and different beam indications.

31. An apparatus for wireless communication, comprising:
- means for transmitting, to a base station, an indication that the apparatus is capable of transmitting or receiving transport block (TB) repetitions using spatial division multiplexing (SDM), wherein the indication indicates that the apparatus is capable of transmitting or receiving TB repetitions in a plurality of codewords;
- means for receiving, from the base station and based at least in part on the indication, at least one downlink control information (DCI) message that schedules a TB in a first resource and a repetition of the TB in a second resource, the first resource and the second resource at least partially overlapping in a time domain and a frequency domain; and
- means for communicating the TB and the repetition of the TB using different antenna panels according to the at least one DCI message.

32. The apparatus of claim 31, wherein the indication indicates that the apparatus is capable of transmitting or receiving TB repetitions in the plurality of codewords scheduled by a single DCI message.

33. The apparatus of claim 31, wherein the at least one DCI message is a single DCI message that schedules a transmission of a first codeword and a second codeword,
- wherein the second codeword is a repetition of the first codeword, and
- wherein the first codeword is to be used for the TB and the second codeword is to be used for the repetition of the TB.

34. The apparatus of claim 31, wherein the indication indicates that the apparatus is capable of transmitting or receiving TB repetitions scheduled by a plurality of DCI messages.

35. The apparatus of claim 31, wherein the at least one DCI message includes a first DCI message and a second DCI message, and
- wherein the first DCI message and the second DCI message identify a same hybrid automatic repeat request process identifier, a same TB size, a same new data indicator value, and different beam indications.

* * * * *